May 21, 1957 M. SUNSKES 2,792,865
SLICER WITH COMPOUND MOVEMEMT BLADE
Filed June 1, 1954 4 Sheets-Sheet 1
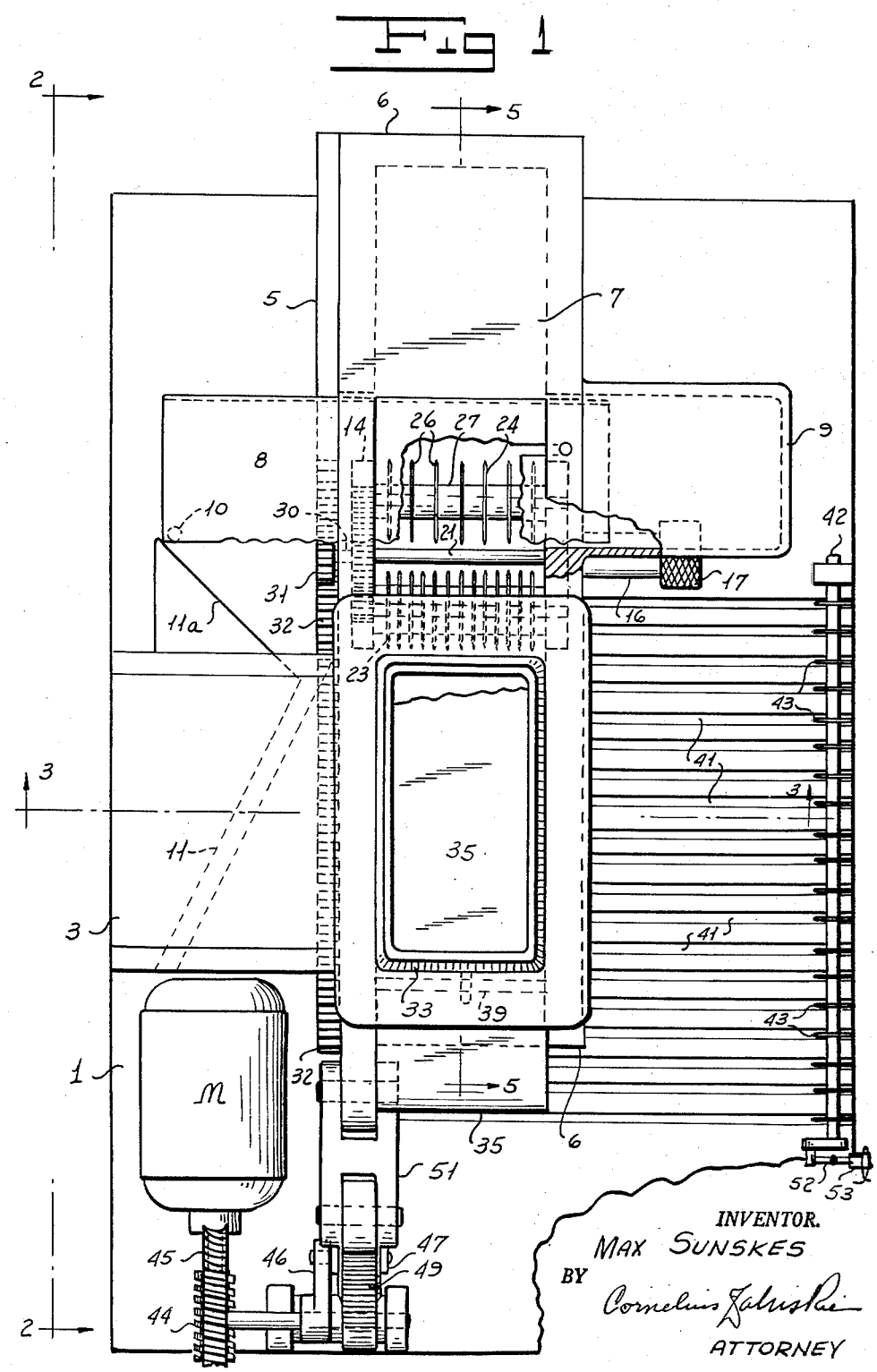

May 21, 1957 M. SUNSKES 2,792,865
SLICER WITH COMPOUND MOVEMEMT BLADE
Filed June 1, 1954 4 Sheets-Sheet 2
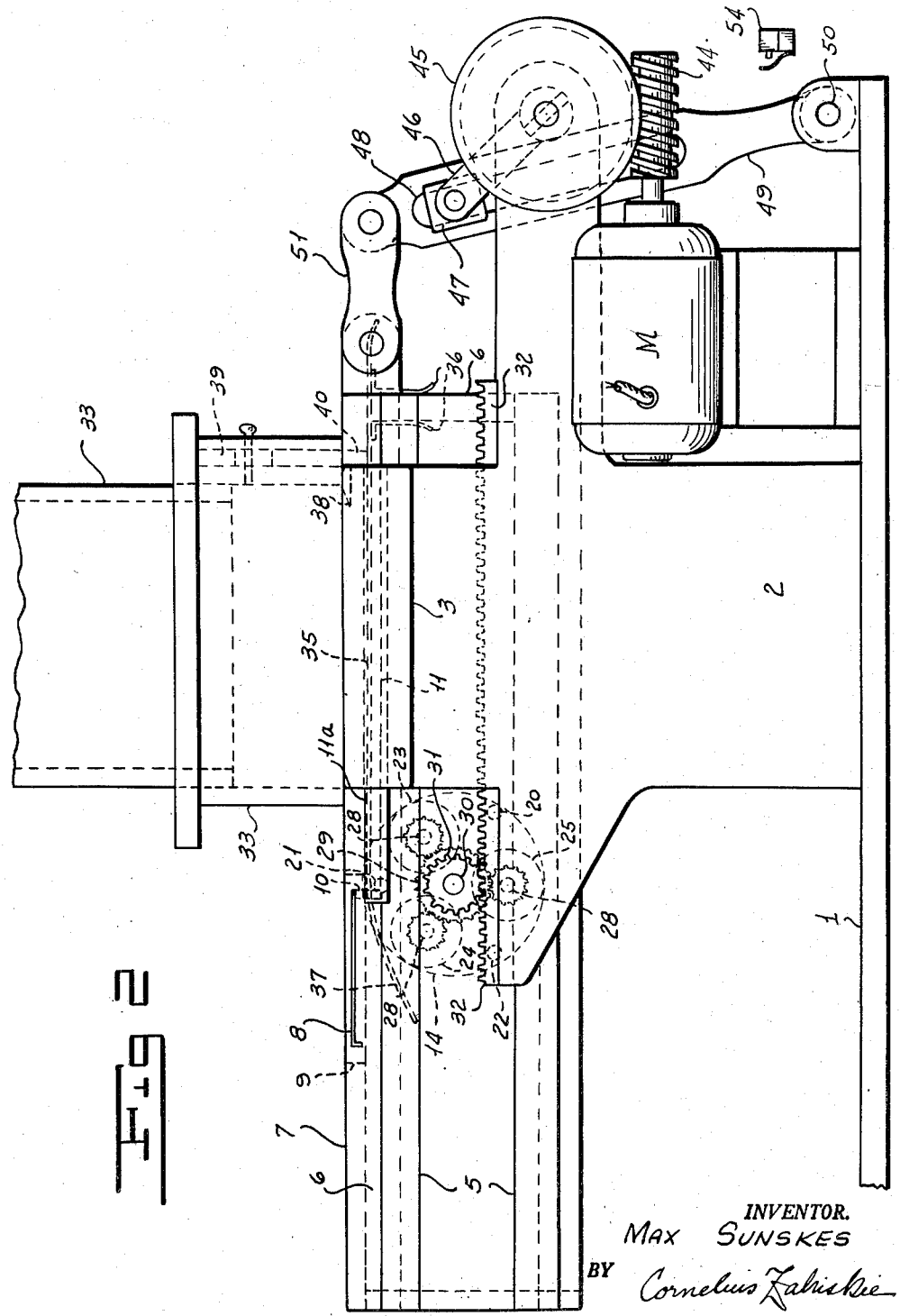
INVENTOR.
Max Sunskes
BY Cornelius Zabriskie
ATTORNEY

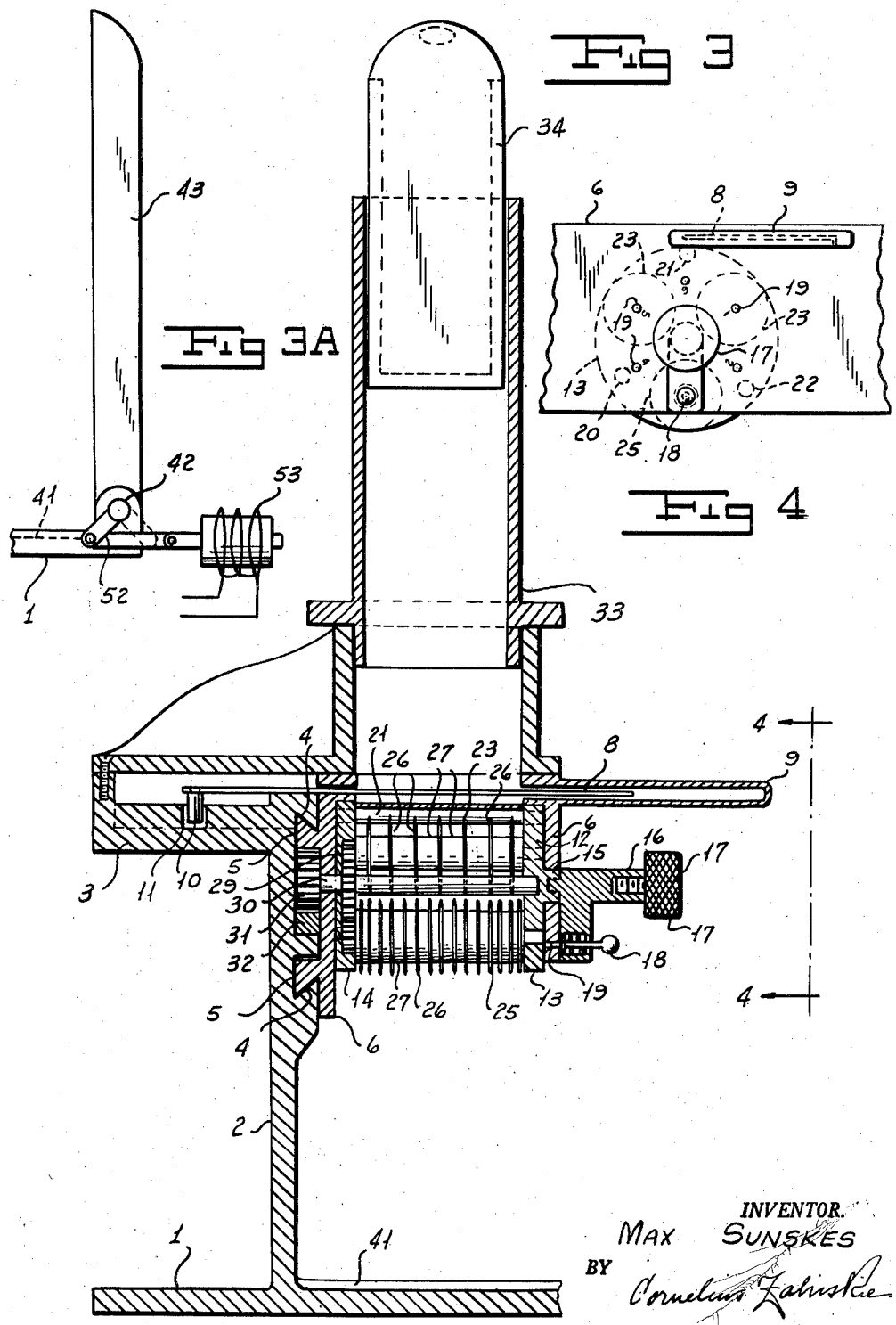

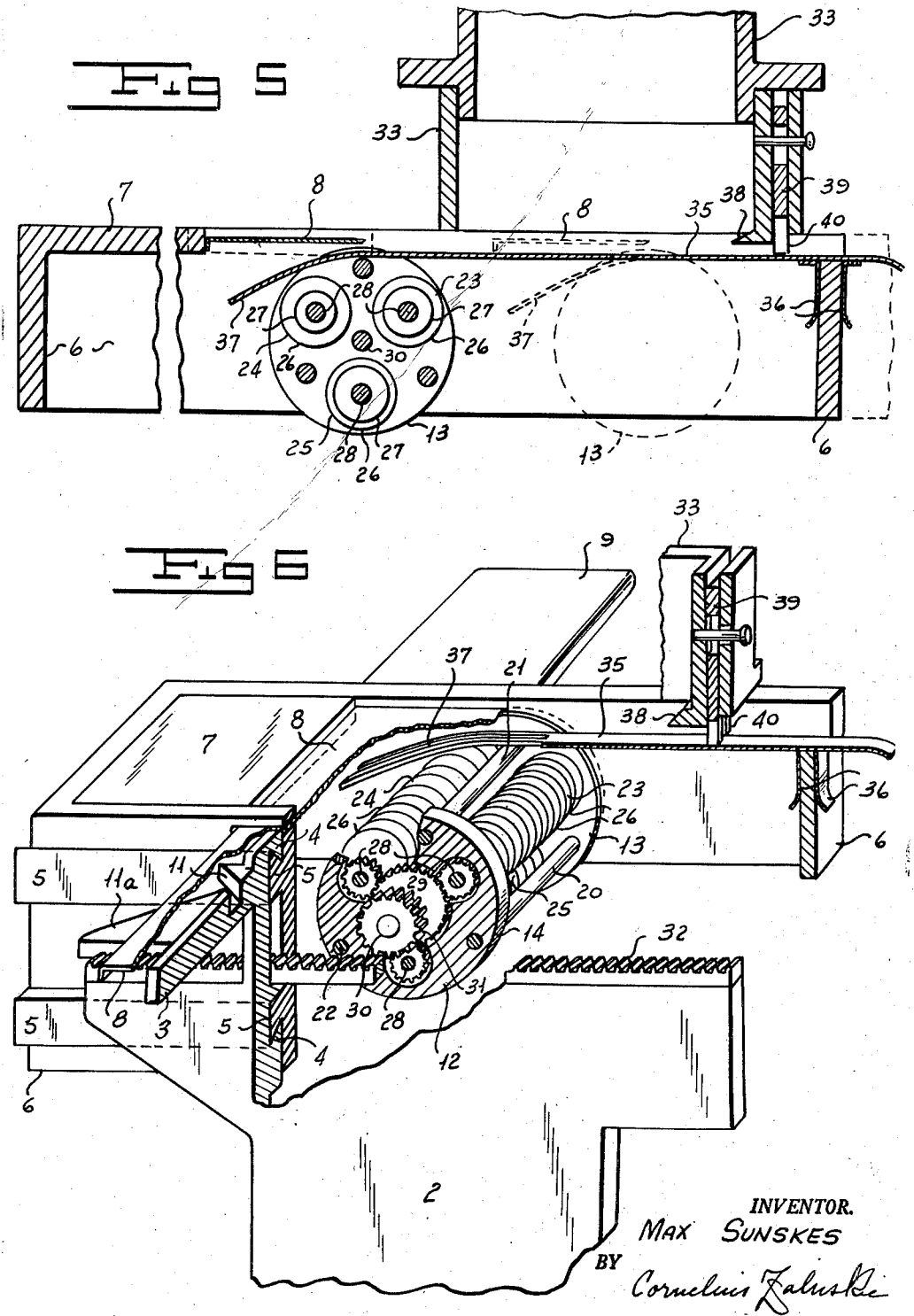

United States Patent Office 2,792,865
Patented May 21, 1957

2,792,865

SLICER WITH COMPOUND MOVEMENT BLADE

Max Sunskes, Bronx, N. Y.

Application June 1, 1954, Serial No. 433,639

1 Claim. (Cl. 146—131)

This invention is a slicing and shredding machine for vegetables, meats, cheese, etc., and the primary object of the invention is to provide a machine which will efficiently act upon a wide variety of edibles in a simple and efficient manner to cut the same cleanly and without tearing or crushing them.

A further object of the invention is to provide a machine which requires little or no maintenance, but which functions effectually for indeterminate periods, one which can be readily dismantled and cleaned and one which may be mechanically operated to produce a large output of edible products in sliced, shredded or diced form, as may be desired.

Speaking generally, the machine of the present invention comprises a holder in which articles to be cut are deposited, to be fed by gravity to a cutting zone, where they may be operated upon solely by a reciprocating blade for slicing such articles or by such blade operating in conjunction with a series of spaced apart rotary cutters to effect simultaneous slicing and shredding thereof. Several sets of rotary cutters are provided and they are mounted to be selectively brought into cooperative relation with the blade, so as to slice and shred at the same time. These several sets of cutters are spaced at different distances apart, so as to form shreds of different width as may be desired and the rotary cutters are so constituted as to control and make uniform the thickness of the shreds thus produced. The thickness of the slices produced in the absence of shredding may also be controlled by the operator, but irrespective as to whether cutting or shredding is accomplished, the cut is smooth and regular and there is no crushing of the product.

The invention provides additionally for the cubing of the shredded products or for the cutting of sliced products into strips. In each instance, provision is made for slices of different thicknesses and for shreds or ribbons of different thicknesses and widths.

An important feature of the invention resides in novel apparatus for operating a shearing blade by means of which the articles are sliced.

Another important feature of the invention resides in the utilization of a cutter barrel on which is supported a plurality of sets of cutters and bottoming bars and which barrel may be regulated at the will of the operator to effect the thickness of the slice and/or width of the strips or shreds.

Features of the invention, other than those adverted to, will be apparent from the hereinafter detailed description and appended claim, when read in conjunction with the accompanying drawings.

The accompanying drawings illustrate one practical embodiment of the invention, but the construction therein shown is to be understood as illustrative, only, and not as defining the limits of the invention.

Fig. 1 is a plan view of a machine embodying the invention with certain parts broken away in the interest of clearness.

Fig. 2 is a side elevation of a machine as viewed from the line 2—2 on the left hand side of Fig. 1.

Fig. 3 is a section on the line 3—3 of Fig. 1 with the rotary cutter barrel centrally of the cutting zone of the machine.

Fig. 3A is an enlarged end elevation of the right hand end of the base of the frame as the frame appears in Fig. 3 and shows in effect the part which is broken off in Fig. 3.

Fig. 4 is a fragmental elevation looking from the line 4—4 on the right hand side of Fig. 3 and showing the manner of adjusting the rotary cutter barrel.

Fig. 5 is a section on the line 5—5 of Fig. 1.

Fig. 6 is a fragmental perspective view showing the central portion of the machine with parts broken way and illustrating the relation between the cutter, a cutting table and the shearing blade.

The machine of this invention embodies an appropriate frame which comprises a flat base 1 provided with an upright standard 2 having a lateral extension or flange 3, as shown best in Fig. 3. This standard 2 is provided internally with a horizontal dove-tail guide slot 4 which receives dove-tail slides 5 of a carrier 6 in such manner as to mount the carrier for horizontal sliding movement on the frame. The carrier is shown of substantially box-like rectangular construction with an open top and an open bottom (Fig. 6) except at the left hand end of the machine where it is partially closed at its top by a plate 7.

Mounted on the carrier for longitudinal reciprocation transversely of the latter is a slicing blade 8 guided for reciprocating movement transversely of the carrier within a safety guard or housing 9 and provided at one of its ends with a pin 10, operating as a cam follower and projecting into a cam track 11 formed in the upper surface of the flange 3 (Fig. 3). One end of this cam track is flared outwardly, as shown at 11a in Fig. 1, so that the pin is automatically fed into the cam track as the carrier is reciprocated from the position of Fig. 1 on its forward stroke to effect a cutting or slicing operation. When the slot is retracted beyond the flared part 11a, the blade 8 may be readily withdrawn from the machine, by moving it to the left in Fig. 1, for the purpose of cleaning or sharpening, as the case may be. As shown in this figure, the forward or cutting edge of the blade is preferably of serpentine or undulating form, so that it will more efficiently cleanly cut a wide variety of products.

With this arrangement it will be manifest that if the carrier is slid longitudinally of the frame to move the blade from the position shown in Fig. 1 to the distant end of the cam track 11, that blade will be longitudinally reciprocated so as to exert a shearing action upon any product in its path.

Positioned within the confines of the carrier and below its upper surface is a cutter barrel 12. This barrel is formed by two end disks 13 and 14 of circular form which are axially spaced apart and are respectively received in circular bearings formed in the inner faces of the opposite side walls of the carrier, as shown best in Fig. 3, although the disk 13 is additionally provided with a hub 15 journalled in a coaxial aperture in the right hand wall of the frame, as shown in this figure. This hub has a threaded connection with a shank 16 of a finger piece 17 by virtue of which the hub may be rotated. The barrel may be locked in any desired position, by means of a spring operated detent 18 adapted to be received in perforations 19, see Figs. 3 and 4, for reasons hereinafter explained. The two disks 13 and 14 are spaced apart from one another by a series of bottoming rods 20, 21 and 22, the opposite ends of which are anchored to the disks. These bottoming rods, of which three are shown, are spaced at different distances from the axis of the barrel and these distances control the thickness of the slices that will be sheared from the article by the cutter.

Between the bottoming rods 20, 21 and 22 and arranged in annular sequence about the barrel, are three sets of cutters 23, 24 and 25. Each set of cutters consists of a plurality of thin circular disks 26 with sharpened edges, these disks being uniformly spaced from one another by intermediate spacing collars 27.

By reference to Fig. 3, it will be noted that the spacing of the disks of the series 25 is relatively close, while the disks of the series 23 is much greater. The spacing of the disks of the series 24 is at an intermediate distance. By withdrawing the detent 18 from the perforation 19, the operator may turn the knob 17 to rotate the barrel 12 and bring any particular series of cutters into cutting relation with the article as presently explained. However, as shown in the drawings, the barrel is positioned to permit slicing without shredding and consequently all of the cutter disks are removed from cutting relation.

In accordance with this invention, the shredding of the article is accomplished through rotation of the particular set of cutter disks which will provide the width of shredding desired and these disks are adapted to perform their cutting operation while operating at fairly high speed, so as to insure clean cutting without tearing. To this end a shaft 28 of each set of disk cutters is provided with a pinion and all three pinions mesh in a planetary system with a common gear 29 fixed on a shaft 30 which is coaxial of the barrel (see Fig. 3). Also fixed on this shaft is a main drive gear 31 which is at all times in mesh with a rectilinear rack 32 mounted in stationary horizontal position on the standard 2, as shown best in Figs. 3 and 6. With this arrangement, it will be apparent that the detent 18 will normally lock the barrel against rotation, while the reciprocation of the carrier 6 will effect simultaneous rotation of all three sets of cutting disks 23, 24 and 25.

The products to be operated upon are adapted to be deposited in a holder or hopper 33 and a weight 34 may be imposed thereon to insure the individual and successive seating of such products upon a cutting table 35, shown best in Fig. 6. This cutting table is in the form of a relatively thin plate, one end of which is provided on its under side with clamping jaws 36 which support that end of the table and secure it to the carrier 6 for longitudinal reciprocation therewith. This table extends longitudinally of the carrier between the side walls thereof and overlies the cutter barrel 12, with that portion of the table which overlies the barrel slotted at 37 after the manner of a comb. These slots are so arranged that their spacing and individual width will permit them to register with any set of cutters 23, 24 or 25, so that the cutters may, when positioned to shred, project through the comb-like end of the table. When the barrel is in the position shown in Fig. 6, the corresponding end of the table will rest upon one of the bottom rods 20, 21 or 22, as the case may be.

The machine as thus far described functions as follows:

If it be assumed that the barrel 12 is in the position shown in Fig. 6, all of the rotary cutters will be retracted from cutting positions. When the machine is thus set, it is prepared for slicing alone without shredding. Consequently, the barrel should be turned by manipulating the knob 17 to engage the table with the particular bottoming rod 20, 21 or 22, that will produce a slice of the desired thickness. If, for example, a piece of bologna is placed in the hopper, while the carrier is retracted to the left in Figs. 5 and 6, the movement of the carrier to the right in these figures will carry with it the slicing blade 8 over the upper surface of the table 35 and into cooperative relation with the lowermost section of the bologna. During this operation, the cutter barrel will be locked against rotation and free from contact with the meat, while the cutter blade 8 will be reciprocated to cleanly cut a slice from the bottom portion of such bologna. The cut will be completed by the time that the knife edge passes beneath a retaining flange 38 at the discharge end of the machine, while the slice will be retained in place by a stop plate 39 which is free for vertical adjustment and which gravitates at all times into contact with the upper surface of the table, as shown in Fig. 6.

As the cutter finishes its forward cutting stroke and the slice which has thus been cut from the bologna is freed from the remainder thereof, the barrel and table move from beneath the slice and it falls by gravity onto the upper surface of the base 1.

The carrier is then withdrawn or retracted and subsequently moved forward again to repeat the operations stated until the desired number of slices have been obtained.

If it is desired to prepare cole slaw from a head of cabbage, the same operations may be carried out by merely slicing the cabbage head to the desired thickness and without necessarily shredding this product. However, if some articles, such as potatoes, were to be shredded, such potatoes are deposited in the hopper as before and the weight imposed thereon as stated. However, in order to shred the potatoes, it will be necessary to bring one of the sets of rotary cutter disks 26 into operative position. If relatively thin shredding is desired, such, for example, as for potatoes Julienne, the cutter will be manipulated by the knob 17, so as to bring the relatively closely spaced disks of the set 23 into position to extend through the slots of the comb 37 of the table 35. In that event, the slotted end of the table will rest upon the spacers 27 between the cutting disks which will control the thickness of the slice produced by the cutting blade 8, while the rotary cutters will simultaneously carry out the shredding operation as the carrier is advanced into engagement with the potatoes.

If the shredding is to be such as to produce sizes appropriate to French fried potatoes, the cutter set 25 is appropriate for use in this connection and the barrel is set accordingly. During this operation of shredding the cutting disks will move beyond the stop plate 39 and consequently the lower edge portion of this plate is preferably slotted at 40 after the manner of a comb with the slots so spaced that the cutting disks may move therethrough without damage.

There are times when it is desired to produce diced products, for example, the dicing of potatoes for use in soups. The present machine provides for a dicing operation. This operation is carried out after the potatoes have been shredded and while they rest upon the upper surface of the base 1. To permit of dicing, the base 1 is provided, in its upper face, with transverse slots 41 (Figs. 1 and 3) and near the outer edge of this side of the base is journalled a shaft 42, shown in Figs. 1 and 3A, which extends longitudinally of the machine and which supports a plurality of closely spaced knife blades 43. After the potatoes have been shredded and have fallen upon the base as stated, these knives may be swung downwardly into the slots 41 to carry out the dicing operation. The knives 43 may be conveniently operated, in a hand operated machine, by providing the shaft 42 with an appropriate handle for this purpose.

The machine which has been described may be operated manually. However, for production purposes, it is preferable that it be motor driven. To this end, I mount upon the frame 1, an electric motor M, to the armature shaft of which is fixed a worm 44 meshing with a worm wheel 45 to the shaft of which is fixed a crank 46. To this crank is pivoted a slide 47 operating in a slot 48 in a lever 49 secured to a pivot 50 on the base. The upper end of the lever is secured by a link 51 to one end of the carrier and, when the motor is energized, the driving connections referred to will effect reciprocatory movement of the carrier in lieu of its manual operation.

To provide for power operation of the dicing blades 43, the shaft 42 may be provided with a crank 52 connected to the core of a solenoid 53 (Figs. 1 and 3A) and this solenoid may be included in an electric circuit with a micro switch 54 (Fig. 2), so arranged that, at the end of the forward or cutting stroke of the carrier, the lever 49 will engage with and close this switch to energize the solenoid and cause it to swing down the knives and dice the shredded material which has been deposited on the base of the machine.

The machine of the present invention has been found to function with high efficiency with all types of vegetables, fruits or meats, to deliver them in solid, uncrushed and natural condition and in a speedy effective manner required for production purposes in restaurants and other places where large quantity production is desired or necessary. All parts of the machine are readily accessible for cleaning and experience has shown that there is a minimum of maintenance required to keep the parts clean and in proper working condition.

The foregoing detailed description sets forth the invention in its preferred practical form, but the invention is to be understood as fully commensurate with the appended claim.

Having thus fully described the invention, what I claim as new and desire to secure by Letters Patent is:

A cutting machine comprising: a frame, a hopper supported on the frame at a cutting station and adapted to contain articles to be cut, a carrier, means for supporting the carrier on the frame for horizontal reciprocating movement rectilinearly across the cutting station and beneath the hopper, a cutting table on the carrier beneath the hopper to support the articles in the hopper as the carrier and table are reciprocated across the cutting station, a slicing blade, means for supporting one end of the cutting table on the carrier back of the hopper at a fixed elevation while permitting the other end of the table to be raised and lowered, and means on the carrier in advance of the hopper for advancing that end of the table with respect to the slicing blade to regulate the thickness of the cut by said blade from an article in the hopper, means for supporting the slicing blade on the carrier for reciprocation transversely of the carrier, a cam follower on the slicing blade and projecting into a stationary cam slot formed in the frame to reciprocate the slicing blade transversely of the carrier as the blade is moved with the carrier into contact with an article within the hopper and supported by the table, and an upright stop plate slidably supported at the back end of the hopper to gravitate into contact with and be vertically supported by the table in all positions of the latter, whereby said stop plate automatically adjusts itself to all positions of the table.

References Cited in the file of this patent

UNITED STATES PATENTS

| | | |
|---|---|---|
| 168,636 | Hagen | Oct. 11, 1875 |
| 944,491 | Madden | Dec. 28, 1909 |
| 1,221,300 | Ersnes | Apr. 3, 1917 |
| 2,108,972 | Orner | Feb. 22, 1938 |
| 2,406,107 | Quinn | Aug. 20, 1946 |
| 2,442,210 | Quinn et al. | May 24, 1948 |
| 2,472,699 | Gangemi | June 7, 1949 |
| 2,533,843 | Sipe | Dec. 12, 1950 |
| 2,583,595 | Rodel et al. | Jan. 29, 1952 |

FOREIGN PATENTS

| | | |
|---|---|---|
| 107,945 | Austria | Nov. 10, 1927 |